(12) United States Patent
Jeong et al.

(10) Patent No.: US 10,401,670 B2
(45) Date of Patent: Sep. 3, 2019

(54) TOUCH PANEL AND TOUCH DISPLAY APPARATUS

(71) Applicant: Samsung Display Co., Ltd., Yongin-si, Gyeonggi-Do (KR)

(72) Inventors: Ji-Woong Jeong, Hwaseong-si (KR); Jaewoong Kang, Jeonju-si (KR); Hyang-A Park, Seoul (KR); Jung-Hyun Yang, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 15/716,121

(22) Filed: Sep. 26, 2017

(65) Prior Publication Data

US 2018/0307075 A1      Oct. 25, 2018

(30) Foreign Application Priority Data

Apr. 25, 2017   (KR) ......................... 10-2017-0053158

(51) Int. Cl.
*G02F 1/133*    (2006.01)
*G02F 1/1333*   (2006.01)
(Continued)

(52) U.S. Cl.
CPC ........ *G02F 1/13338* (2013.01); *G02F 1/1368* (2013.01); *G02F 1/13306* (2013.01); *G02F 1/13439* (2013.01); *G02F 1/133345* (2013.01); *G02F 1/133528* (2013.01); *G02F 1/133617* (2013.01); *G02F 1/133621* (2013.01); *G02F 1/134309* (2013.01); *G02F 1/136286* (2013.01); *G06F 3/044* (2013.01); *G06F 3/0412* (2013.01); *G02F 2001/133548* (2013.01);

(Continued)

(58) Field of Classification Search
CPC ..... G02F 1/13338; G02F 2001/133548; G02F 2001/01791; G02B 5/3058; G02B 6/0229; H01L 31/035218
See application file for complete search history.

(56) References Cited

U.S. PATENT DOCUMENTS 9,535,524 B2     1/2017   Liu et al.
2013/0242228 A1*  9/2013  Park .................. G02F 1/133617
                                                                349/61

(Continued)

FOREIGN PATENT DOCUMENTS

KR   10-2013-0035243    4/2013

*Primary Examiner* — Paisley L Arendt
*Assistant Examiner* — Mariam Qureshi
(74) *Attorney, Agent, or Firm* — Innovation Counsel LLP

(57) ABSTRACT

A touch panel includes a first polarizing element, a first substrate, a liquid crystal layer, a second polarizing element, a touch electrode layer, a color converting layer and a second substrate. The first polarizing element has a first polarizing axis. The first substrate is disposed on the first polarizing element. The liquid crystal layer is disposed on the first substrate. The second polarizing element is disposed on the liquid crystal layer, includes a plurality of polarizing touch electrodes, and has a second polarizing axis crossing the first polarizing axis. The touch electrode layer is disposed on the liquid crystal layer, disposed adjacent to the second polarizing element and includes a plurality of touch electrodes. The color converting layer is disposed on the second polarizing element. The second substrate is disposed on the color converting layer.

20 Claims, 10 Drawing Sheets

(51) Int. Cl.
*G06F 3/041* (2006.01)
*G06F 3/044* (2006.01)
*G02F 1/1335* (2006.01)
*G02F 1/1343* (2006.01)
*G02F 1/1362* (2006.01)
*G02F 1/1368* (2006.01)

(52) U.S. Cl.
CPC ............ *G02F 2001/133614* (2013.01); *G02F 2202/36* (2013.01)

(56) References Cited

U.S. PATENT DOCUMENTS

| | | | |
|---|---|---|---|
| 2014/0016044 A1* | 1/2014 | Tung | G06F 3/0412 |
| | | | 349/12 |
| 2014/0292710 A1* | 10/2014 | Koito | G06F 3/044 |
| | | | 345/174 |
| 2016/0041430 A1* | 2/2016 | Lee | G02F 1/133617 |
| | | | 349/96 |
| 2017/0090627 A1* | 3/2017 | Kim | G06F 3/047 |
| 2017/0220158 A1* | 8/2017 | Peng | G06F 3/0412 |
| 2018/0188866 A1* | 7/2018 | Heo | G06F 3/0412 |

\* cited by examiner

TOUCH PANEL AND TOUCH DISPLAY APPARATUS

CROSS-REFERENCE TO RELATED APPLICATION

This application claims priority to and the benefit of Korean Patent Application No. 10-2017-0053158, filed on Apr. 25, 2017; the disclosure of the Korean Patent Application is incorporated by reference herein in its entirety.

BACKGROUND

1. Field

The technical field is related to a touch panel and/or related to a touch display apparatus including a touch panel.

2. Description of the Related Art

In a touch panel, if all of touch electrodes for sensing touches are formed in a single layer, a touch sensing area of the touch panel may need to give way to a large number of wirings. Thus, the touch sensing area may not be satisfactorily large, and sensing accuracy of the touch panel may be unsatisfactory. In addition, the large number of the wirings may complicate the manufacturing process of the touch panel, so that manufacturing cost of the touch panel and/or a related touch display apparatus may be undesirably high.

If the touch electrodes are formed in two layers, manufacturing cost of the touch panel and/or the related touch display apparatus may be undesirably high due to the number of glass substrates required for supporting the touch electrodes.

SUMMARY

Embodiments may be related to a touch panel comprising a color converting layer, comprising a liquid crystal layer, and configured to sense a touch using a polarizing electrode of a polarizing element and using a touch electrode of a touch electrode layer.

Embodiments may be related to a touch display apparatus including the touch panel.

In an embodiment, a touch panel includes a first polarizing element, a first substrate, a liquid crystal layer, a second polarizing element, a touch electrode layer, a color converting layer and a second substrate. The first polarizing element has a first polarizing axis. The first substrate is disposed on the first polarizing element. The liquid crystal layer is disposed on the first substrate. The second polarizing element is disposed on the liquid crystal layer and includes a plurality of polarizing touch electrodes extending in a direction of a second polarizing axis crossing the first polarizing axis. The touch electrode layer is disposed on the liquid crystal layer, disposed adjacent to the second polarizing element and includes a plurality of touch electrodes. The color converting layer is disposed on the second polarizing element and includes a quantum dot particle. The second substrate is disposed on the color converting layer.

In an embodiment, the touch electrodes of the touch electrode layer may extend in a first direction. The polarizing touch electrodes of the second polarizing element may extend in a second direction crossing the first direction.

In an embodiment, a capacitance formed between the touch electrode and the polarizing touch electrode may be changed when a user touches the touch panel.

In an embodiment, a width of the touch electrode in the second direction may be greater than a gap between the adjacent touch electrodes in the second direction.

In an embodiment, the touch electrode layer may further include a dummy electrode disposed between the adjacent touch electrodes, extending in a direction substantially the same as an extending direction of the touch electrodes and having an island shape.

In an embodiment, wherein the touch electrode may include a plurality of sensing portions and a connecting portion connecting the sensing portions. The sensing portion may have a rhombus shape.

In an embodiment, the touch panel may further include a connecting line connecting the polarizing touch electrodes.

In an embodiment, the second polarizing element may be disposed between the touch electrode layer and the liquid crystal layer. The second polarizing element may further include a capping layer disposed under the polarizing touch electrodes to protect the polarizing touch electrodes. The touch panel may further include an insulating layer disposed between the polarizing touch electrodes and the touch electrodes.

In an embodiment, the touch electrode layer may be disposed between the second polarizing element and the liquid crystal layer. The second polarizing element may further include a capping layer disposed under the polarizing touch electrodes to protect the polarizing touch electrodes. The capping layer may be disposed between the polarizing touch electrodes and the touch electrodes.

In an embodiment, the color converting layer may include a first subpixel area including a plurality of red quantum dot particles and a second subpixel area including a plurality of green quantum dot particles.

In an embodiment, the color converting layer may further include a third subpixel area including a plurality of scattering particles.

In an embodiment, a touch display apparatus includes a touch panel, a backlight unit, a gate driver, a data driver, a first touch driver and a second touch driver. The touch panel includes a first polarizing element, a first substrate, a liquid crystal layer, a second polarizing element, a touch electrode layer, a color converting layer and a second substrate. The first polarizing element has a first polarizing axis. The first substrate is disposed on the first polarizing element. The first substrate includes a plurality of gate lines, a plurality of data line, a plurality of switching elements and a plurality of pixels. The liquid crystal layer is disposed on the first substrate. The second polarizing element is disposed on the liquid crystal layer and includes a plurality of polarizing touch electrodes extending in a direction of a second polarizing axis crossing the first polarizing axis. The touch electrode layer is disposed on the liquid crystal layer, disposed adjacent to the second polarizing element and includes a plurality of touch electrodes. The color converting layer is disposed on the second polarizing element and includes a quantum dot particle. The second substrate is disposed on the color converting layer. The backlight unit is configured to provide light to the touch panel. The gate driver is configured to drive the gate lines. The data driver is configured to drive the data lines. The first touch driver is connected to the polarizing touch electrodes of the second polarizing element. The second touch driver is connected to the touch electrodes of the touch electrode layer.

In an embodiment, the touch electrodes of the touch electrode layer may extend in a first direction. The polarizing touch electrodes of the second polarizing element may extend in a second direction crossing the first direction.

In an embodiment, a capacitance formed between the touch electrode and the polarizing touch electrode may be changed when a user touches the touch panel.

In an embodiment, the touch panel may further include a connecting line connecting the polarizing touch electrodes.

In an embodiment, the backlight unit may be configured to provide blue light to the touch panel.

In an embodiment, the color converting layer may include a first subpixel area including a plurality of red quantum dot particles and a second subpixel area including a plurality of green quantum dot particles.

In an embodiment, the color converting layer may further include a third subpixel area including a plurality of scattering particles.

An embodiment may be related to a touch panel. The touch panel may include a first polarizing element, a first substrate, a liquid crystal layer, a second polarizing element, a touch electrode layer, a color converting layer and a second substrate. The first polarizing element has a first polarizing axis. The first substrate may be disposed on the first polarizing element. The liquid crystal layer may be disposed on the first substrate. The second polarizing element may be disposed on the liquid crystal layer, may include a plurality of polarizing touch electrodes, and has a second polarizing axis crossing the first polarizing axis. The touch electrode layer may be disposed on the liquid crystal layer, disposed adjacent to the second polarizing element and may include a plurality of touch electrodes. The color converting layer may be disposed on the second polarizing element. The second substrate may be disposed on the color converting layer.

The color converting layer may include a quantum dot particle.

A touch electrode of the touch electrode layer may extend in a first direction. A polarizing electrode of the second polarizing element may extend in a second direction crossing the first direction.

The touch panel may include a first touch driver electrically connected to the second polarizing member and configured to receive one or more electric signals from one or more of the polarizing electrodes.

A width of the touch electrode in the second direction may be greater than a width of the polarizing electrode in the first direction.

A width of the touch electrode in the second direction may be greater than a gap between two immediately neighboring touch electrodes of the touch electrode layer in the second direction.

The touch electrode layer may include a dummy electrode disposed between two of the touch electrodes and electrically isolated from all drivers of the touch panel.

The touch electrode may include two sensing portions and a connecting portion electrically connecting the two sensing portions. Each of the two sensing portions may be wider than the connecting portion in the second direction.

The touch panel may include a connecting line electrically connecting two or more of the polarizing electrodes.

The touch panel may include an insulating layer disposed between the second polarizing element and the touch electrode layer. The second polarizing element or the touch electrode layer may be disposed between the insulating layer and the liquid crystal layer.

The touch panel may include a capping layer disposed between the second polarizing element and the liquid crystal layer.

The touch panel may include a capping layer disposed between the second polarizing element and the touch electrode layer. The touch electrode layer may be disposed between the second polarizing element and the liquid crystal layer.

The touch electrode may be thinner than the polarizing electrode in a third direction.

The third direction may be perpendicular to each of the first direction and the second direction.

A first width of the touch electrode in the second direction may be less than a second width of the touch electrode in the second direction and may be greater than a width of the polarizing electrode.

An embodiment may be related to a touch display apparatus. The touch display apparatus may include the following elements: a first polarizing element having a first polarizing axis; a first substrate disposed on the first polarizing element and comprising gate line, a data line, and a switching element electrically connected to each of the gate line and the data line; a liquid crystal layer disposed on the first substrate; a second polarizing element disposed on the liquid crystal layer, comprising a plurality of polarizing electrodes, and having a second polarizing axis crossing the first polarizing axis; a touch electrode layer disposed on the liquid crystal layer, disposed adjacent to the second polarizing element, and comprising a plurality of touch electrodes; a color converting layer disposed on the second polarizing element and comprising a quantum dot particle; a second substrate disposed on the color converting layer; a backlight unit configured to provide light to the touch panel; a gate driver electrically connected to the gate line; a data driver electrically connected to the data line; a first touch driver electrically connected to the polarizing electrodes of the second polarizing element; and a second touch driver electrically connected to the touch electrodes of the touch electrode layer.

A touch electrode of the touch electrode layer may extend in a first direction. A polarizing electrode of the second polarizing element may extend in a second direction crossing the first direction.

The touch display apparatus may include a buffer and a signal line. The first touch driver may be electrically connected through the signal line and the buffer to the second polarizing element.

A width of the touch electrode in the second direction may be greater than a width of the polarizing electrode in the first direction.

The touch display apparatus may include a connecting line electrically connecting two or more of the polarizing electrodes.

The backlight unit may be configured to provide blue light to the touch panel.

The touch electrode layer may include a dummy electrode disposed between two of the touch electrodes and electrically isolated from the second touch driver.

The touch display apparatus may include an insulating layer disposed between the second polarizing element and the touch electrode layer and directly contacting each of the second polarizing element and the touch electrode layer.

A touch electrode of the touch electrodes may extend in a first direction. A polarizing electrode of the polarizing electrodes may extend in a second direction crossing the first direction. A width of the touch electrode in the second direction may be greater than a width of the polarizing electrode in the first direction. The touch electrode may be thinner than the polarizing electrode in a third direction perpendicular to each of the first direction and the second direction.

The touch display apparatus may include an insulating layer disposed between the second polarizing element and the touch electrode layer and directly contacting each of the second polarizing element and the touch electrode layer. The liquid crystal layer may be disposed between the insulating layer and the first polarizing element.

According to embodiments, a touch may be sensed using a polarizing electrode of a polarizing element and using a touch electrode of a touch electrode layer. Advantageously, the accuracy of sensing the touch may be optimized, and/or the manufacturing cost of the touch display apparatus may be minimized.

DETAILED DESCRIPTION

Embodiments are described with reference to the accompanying drawings. Although the terms "first", "second", etc. may be used herein to describe various elements, these elements, should not be limited by these terms. These terms may be used to distinguish one element from another element. Thus, a first element discussed below may be termed a second element without departing from teachings of one or more embodiments. The description of an element as a "first" element may not require or imply the presence of a second element or other elements. The terms "first", "second", etc. may also be used herein to differentiate different categories or sets of elements. For conciseness, the terms "first", "second", etc. may represent "first-category (or first-set)", "second-category (or second-set)", etc., respectively. The term "connect" may mean "electrically connect". The term "insulate" may mean "electrically insulate". The term "pattern" man mean "member" or "unit".

Figure 1:
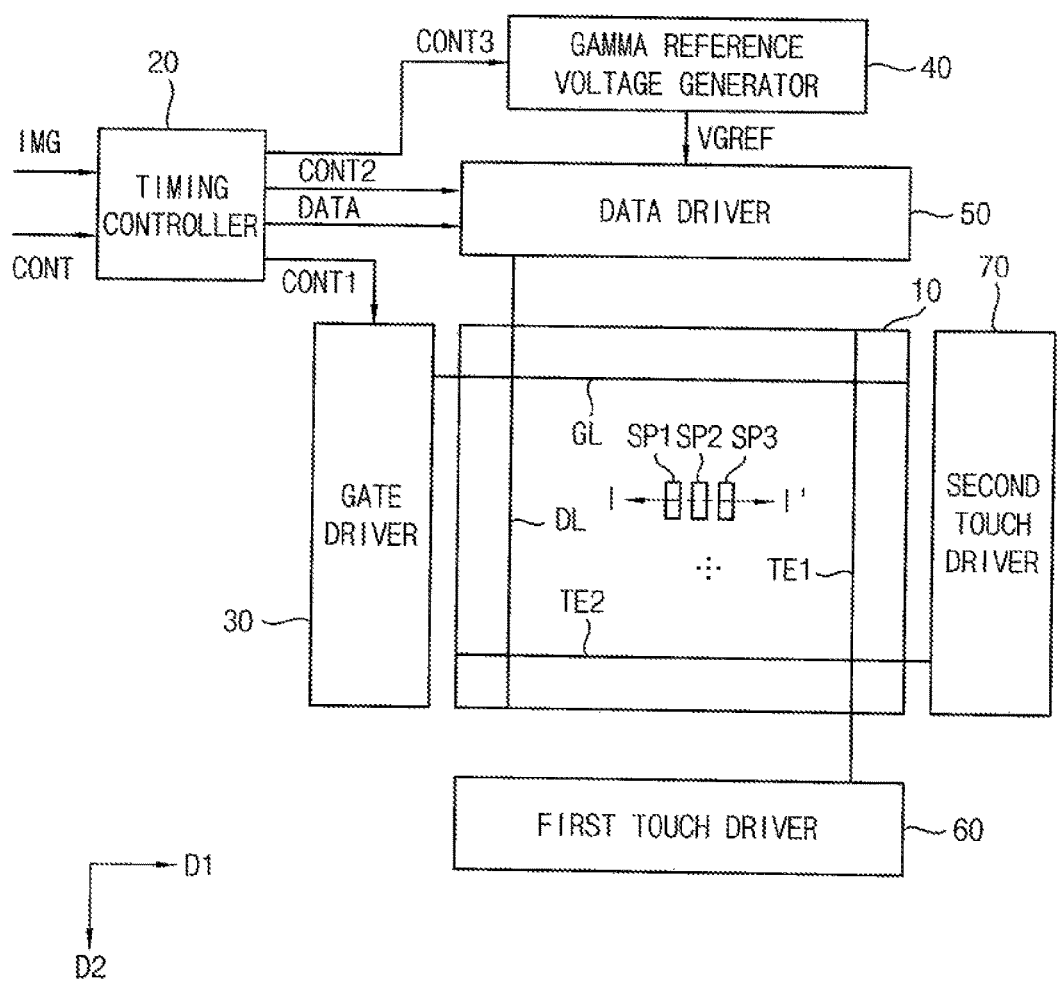
FIG. 1 is a block diagram illustrating a touch display apparatus according to an embodiment.

FIG. 1 is a block diagram illustrating a touch display apparatus according to an embodiment.

Referring to FIG. 1, the touch display apparatus may include a touch panel 10, a display panel driver, and a touch driver. The display panel driver may include a timing controller 20, a gate driver 30, a gamma reference voltage generator 40, and a data driver 50. The touch driver may include a first touch driver 60 and a second touch driver 70. The touch display apparatus may further include a back light unit (e.g., BLU of FIG. 2).

The touch panel 10 may include a plurality of gate lines GL, a plurality of data lines DL, a plurality of pixel electrodes, and a plurality of switching elements electrically connected to the gate lines GL and the data lines DL. The pixel electrodes may be electrically connected to the data lines DL through the switching elements. The gate lines GL may extend in a first direction D1, and the data lines DL may extend in a second direction D2 crossing the first direction D1.

The pixel electrodes may include a first subpixel area SP1, a second subpixel area SP2, and a third subpixel area SP3 respectively emitting lights having different colors.

The touch panel 10 may include a first substrate, a second substrate facing the first substrate, and a liquid crystal layer disposed between the first substrate and the second substrate. The gate lines, the data lines, pixel electrodes of the pixels, and the switching elements may be formed on the first substrate. A common electrode may be formed on the second substrate.

The timing controller 20 may receive input image data IMG and an input control signal CONT from an external apparatus (not shown). The input image data may include red image data, green image data, and blue image data. The input control signal CONT may include a master clock signal and a data enable signal. The input control signal CONT may further include a vertical synchronizing signal and a horizontal synchronizing signal.

The timing controller 20 may generate a first control signal CONT1, a second control signal CONT2, a third control signal CONT3, and a data signal DATA based on the input image data IMG and the input control signal CONT.

The timing controller 20 may generate the first control signal CONT1 for controlling an operation of the gate driver 30 based on the input control signal CONT, and outputs the first control signal CONT1 to the gate driver 30. The first control signal CONT1 may further include a vertical start signal and a gate clock signal.

The timing controller 20 may generate the second control signal CONT2 for controlling an operation of the data driver 50 based on the input control signal CONT, and outputs the second control signal CONT2 to the data driver 50. The second control signal CONT2 may include a horizontal start signal and a load signal.

The timing controller 20 may generate the data signal DATA based on the input image data IMG The timing controller 20 may output the data signal DATA to the data driver 50.

The timing controller 20 may generate the third control signal CONT3 for controlling an operation of the gamma reference voltage generator 40 based on the input control signal CONT, and may output the third control signal CONT3 to the gamma reference voltage generator 40.

The gate driver 30 may generate gate signals driving the gate lines GL in response to the first control signal CONT1 received from the timing controller 20. The gate driver 300 outputs the gate signals to the gate lines GL.

The gamma reference voltage generator 40 may generate a gamma reference voltage VGREF in response to the third control signal CONT3 received from the timing controller 200. The gamma reference voltage generator 40 may provide the gamma reference voltage VGREF to the data driver 50. The gamma reference voltage VGREF may have a value corresponding to a level of the data signal DATA.

The data driver 50 may receive the second control signal CONT2 and the data signal DATA from the timing controller 20, and receive the gamma reference voltages VGREF from the gamma reference voltage generator 40. The data driver 50 may convert the data signal DATA into data voltages having an analog type using the gamma reference voltages VGREF. The data driver 50 may output the data voltages to the data lines DL.

The first touch driver 60 is connected to a plurality of first touch electrodes TE1 of the touch panel 10. The second touch driver 70 is connected to a plurality of second touch electrodes TE2 of the touch panel 10. The first and second touch drivers 60 and 70 sense a touch position using the first and second touch electrodes TE1 and TE2.

The first and second touch drivers 60 and 70 may sense the touch position using change of capacitance between the first and second touch electrodes TE1 and TE2.

Figure 2:
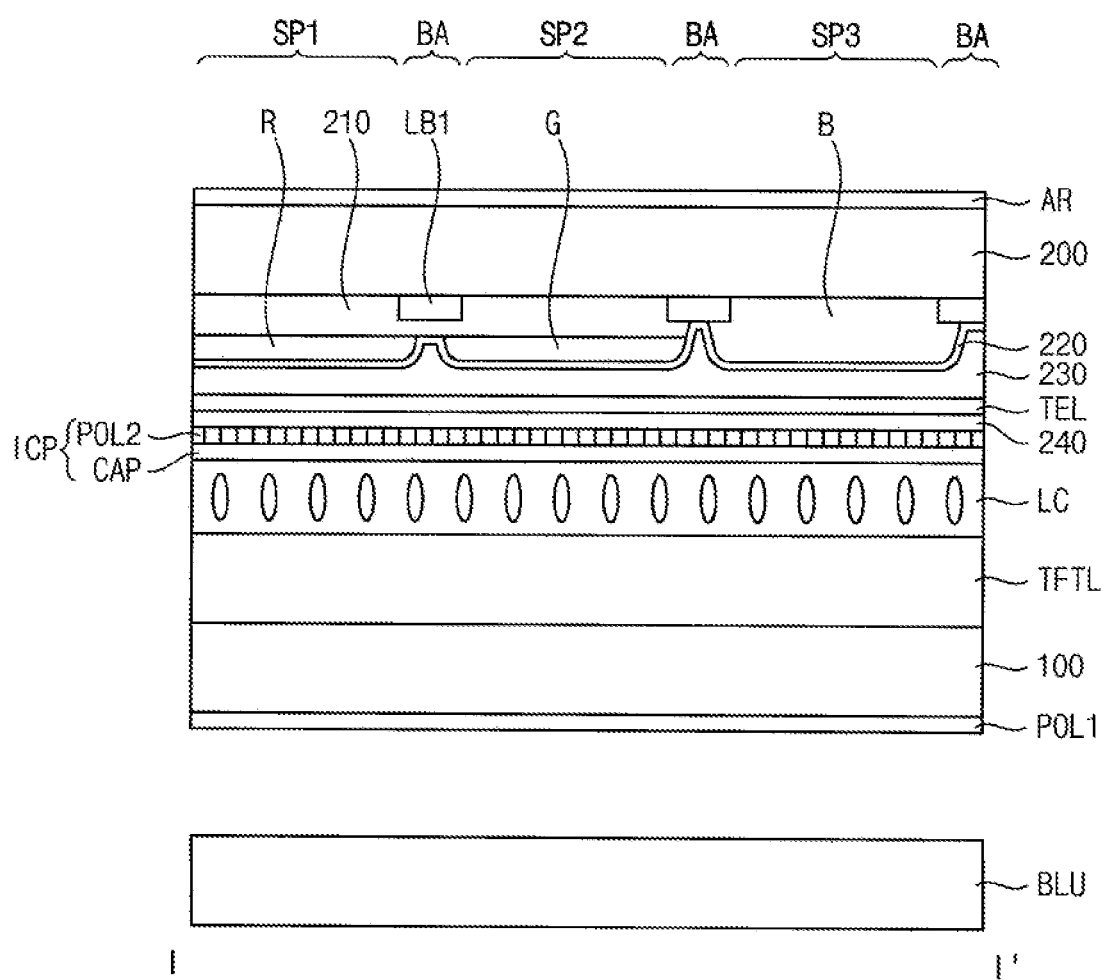
FIG. 2 is a cross-sectional view of the touch display apparatus cut along a line I-I' of FIG. 1 according to an embodiment.

FIG. 2 is a cross-sectional view of the touch display apparatus cut along a line I-I' of FIG. 1.

Referring to FIGS. 1 and 2, the touch display apparatus includes the touch panel and a backlight unit BLU providing light to the touch panel. The backlight unit BLU may be disposed under the touch panel.

The touch panel may include a first polarizing element POL1, a first substrate 100, a liquid crystal layer LC, a second polarizing element ICP, a touch electrode layer TEL, a color converting layer, and a second substrate 200. The touch panel may further include a switching element layer TFTL, an insulating layer 240, and an anti-reflection layer AR.

The first polarizing element POL1 has a first polarizing axis. The first polarizing element POL1 may be an absorption type polarizing element such as a polyvinyl alcohol (PVA) polarizing element. In an embodiment, the first polarizing element POL1 may be a reflection type polarizing element such as a wire grid polarizing element.

The first substrate 100 is disposed on the first polarizing element POL1. The first substrate 100 may include a transparent insulation material. For example, the first substrate 100 may be one of a glass substrate, a quartz substrate, and a transparent resin substrate. The transparent resin substrate may include one or more of polyimide-based resin, acryl-based resin, polyacrylate-based resin, polycarbonate-based resin, polyether-based resin, sulfonic acid containing resin, polyethyleneterephthalate-based resin, etc.

The switching element layer TFTL may be disposed on the first substrate 100. Although not shown in figures in detail, the switching element layer TFTL may include signal wirings such as a gate line and a data line for transmitting signals to drive the touch display apparatus, and may include a switching element that includes a gate electrode, an active pattern, a source electrode, and a drain electrode and is electrically connected to the signal wirings. The switching element is electrically connected to the pixel electrode. The switching element and the pixel electrode may be formed corresponding to a subpixel area (e.g. a first subpixel area, a second subpixel area and a third subpixel area). For example, the switching element is formed at a light blocking area BA (overlapping a light blocking pattern LB1) adjacent to the first subpixel area SP1. The pixel electrode connected to the switching element may be formed in the first subpixel area SP1. For example, the switching element may be a thin film transistor.

The liquid crystal layer LC is disposed on the first substrate. The liquid crystal layer LC may be disposed on the switching element layer TFTL. The liquid crystal layer LC may include liquid crystal molecules having optical anisotropy. The liquid crystal molecules are driven by electric field, so that an image is displayed by passing or blocking light through the liquid crystal layer LC. Although not shown in the figures, the touch display apparatus may further include alignment layers disposed above and below the liquid crystal layer LC.

The second polarizing element ICP is disposed on the liquid crystal layer LC. The second polarizing element set ICP (or second polarizing element ICP) includes a second polarizing element POL2 (or a plurality of polarizing touch electrodes POL2 extending in the second direction) having a second polarizing axis crossing the first polarizing axis. The second polarizing element (set) ICP may further include a capping layer CAP disposed under the polarizing touch electrodes POL2 to protect the polarizing touch electrodes POL2. For example, the capping layer CAP may include an insulating material. The polarizing touch electrodes POL2 may include a transparent conductive material.

The second polarizing element ICP may be a wire grid polarizing element. The wire grid polarizing element may include a plurality of fine lines extending in one direction, which include metal and are arranged at regular intervals. The fine lines may be the polarizing touch electrodes. The fine lines may have a pitch in a range of about 50 nm (nanometer) to 150 nm. The pitch refers to sum of a width of one fine line and a distance between immediately adjacent fine lines.

For example, the polarizing touch electrodes include a metal material.

The touch electrode layer TEL is disposed on the liquid crystal layer LC. The touch electrode layer TEL may be disposed adjacent to the second polarizing element ICP. The touch electrode layer TEL may include a plurality of touch electrodes TE. The touch electrodes may include a transparent conductive material. The touch electrodes may include indium-tin oxide (ITO) or indium-zinc oxide (IZO).

In an embodiment, the touch electrode layer TEL may be disposed on the second polarizing element ICP. The insulating layer 240 may be disposed between the touch electrode layer TEL and the second polarizing element ICP to insulate the touch electrodes of the touch electrode layer TEL from the polarizing touch electrodes POL2 of the second polarizing element ICP.

The color converting layer may be disposed on the second polarizing element ICP. The color converting layer may be disposed on the touch electrode layer TEL. The color converting layer may include a first color converting pattern R, a second color converting pattern and a third color converting pattern B. The color converting layer may further include a blue light blocking pattern 210, a covering layer 220, and a planarizing layer 230.

The backlight unit BLU may be disposed under the first substrate 100 and provide light toward the first substrate 100. For example, the backlight unit BLU may include a light source generating a blue light having a wavelength of blue color.

The blue light blocking pattern 210 may be disposed under the second substrate 200 under which the light blocking pattern LB1 is disposed. The light blocking pattern LB1 may be disposed in the light blocking area BA. The blue light blocking pattern 210 may be disposed in the first and second subpixel areas SP1 and SP2. The blue light blocking pattern 210 may be formed by accumulating at least two layers having different refractive indexes. The blue light blocking pattern 210 may block the light having the wavelength of blue color and pass the light having other wavelengths. The light blocked by the blue light blocking pattern 210 may be reflected and recycled.

The first color converting pattern R may be disposed under the blue light blocking pattern 210 in the first subpixel area SP1. The first light converting pattern R may be a red converting pattern. The first color converting pattern R may convert the blue light provided from the backlight unit BLU to the red light. For example, the first color converting pattern R may include a red quantum dot particle.

The second color converting pattern G may be disposed under the blue light blocking pattern 210 in the second subpixel area SP2. The second light converting pattern G may be a green converting pattern. The second color converting pattern G may convert the blue light provided from the backlight unit BLU to the green light. For example, the second color converting pattern G may include a green quantum dot particle.

Each of the red and green quantum dot particles has a crystal structure of nano-scale. Each of the red and green quantum dot particles includes hundreds to thousands of atoms. The size of the quantum dot particle is very little so that a quantum confinement effect may be generated. The quantum confinement effect means that an energy band gap of an object is increased when the object becomes smaller than nano size. When the light having energy higher than that of the band gap is incident to the quantum dot particle, the quantum dot particle may absorb the light and may emit a second light having a specific wavelength and an energy level in the ground state. The wavelength of the emitted second light may have a value corresponding to the band gap. When a size and a composition of the quantum dot particle are adjusted, the emission property of the quantum dot particle may be controlled by the quantum confinement The composition of the quantum dot particles is not limited to a specific composition, and any suitable composition may be used. For example, the quantum dot particle may be a quantum dot particle of Group II-VI elements, Group III-V elements, Group IV elements, or Group IV-VI elements. The Group II elements may be selected from the group consisting of at least one of zinc, cadmium, and mercury. The group III elements may be selected from the group consisting of at least one of aluminum, gallium, and indium. The Group IV elements may be selected from the group consisting of at least one of silicon, germanium, tin, and lead. The Group V elements may be selected from the group consisting of at least one of nitrogen, phosphorus, and arsenic. The Group VI elements may be selected from the group consisting of at least one of sulfur, selenium, and tellurium.

The third color converting pattern B may be disposed under the second substrate 200 in the third subpixel area SP3. The third color converting pattern B may include scattering particles that change direction of light provided from the backlight unit BLU and passing through the third color converting pattern B without changing color. The scattering particles may be particles of TiO2 or the like. In addition, the third color converting pattern B may include blue pigment for converting light passing therethrough to blue light, and size of the scattering particle may be similar to size of the red quantum dot particle or the green quantum dot particle.

The covering layer 220 may be disposed under the first color converting pattern R, the second color converting pattern G and the third color converting pattern B. The covering layer 220 may cover the first color converting pattern R, the second color converting pattern G and the third color converting pattern B.

The covering layer 220 may be a light recycling filter. For example, the covering layer 220 may be a yellow light recycling filter. The light recycling filter may reflect light which is generated from the backlight unit BLU and reflected by the first to third color converting patterns R, G, and B, and the blue light blocking pattern 210 toward the liquid crystal layer LC, so that brightness of the display apparatus can be improved.

The planarizing layer 230 may be disposed under the covering layer 220. The planarizing layer 230 may planarize a lower surface of the covering layer 220, and may include organic or inorganic insulating material.

The second substrate 200 may be disposed on the color converting layer. The second substrate 200 may face the first substrate 100. The second substrate 200 may include a transparent insulating substrate. For example, the second substrate 200 may be one of a glass substrate, a quartz substrate, and a transparent resin substrate. The transparent resin substrate may include at least one of polyimide-based resin, acryl-based resin, polyacrylate-based resin, polycarbonate-based resin, polyether-based resin, sulfonic acid containing resin, polyethyleneterephthalate-based resin, etc.

The anti-reflection layer AR may be disposed on the second substrate 200. The anti-reflection layer AR is to reduce reflections due to internal structures of the display apparatus against external light, and may include a leaner polarizer and a ¼ wave retarder overlapped with the leaner polarizer.

Figure 3:
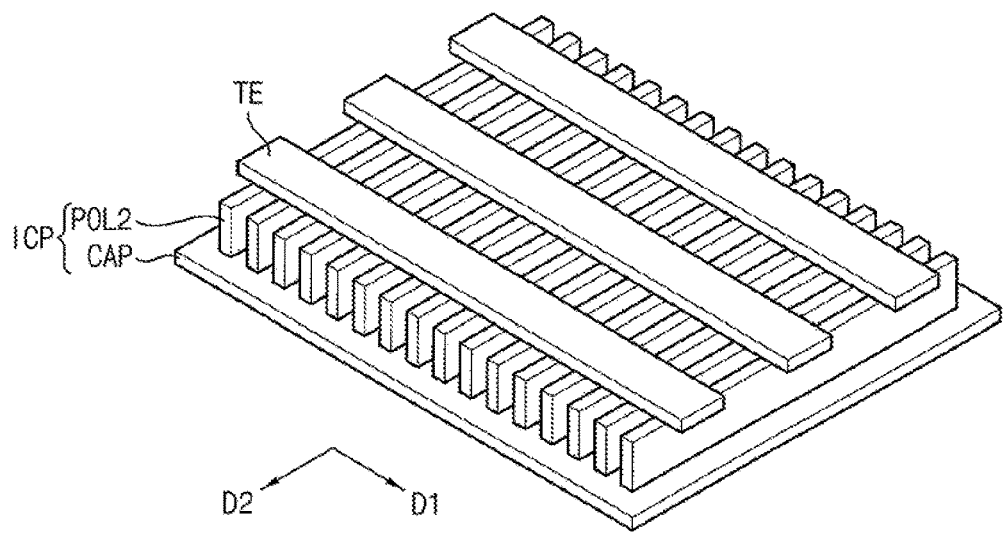
FIG. 3 is a perspective view illustrating a second polarizing element and a touch electrode layer of FIG. 2 according to an embodiment.
Figure 4:
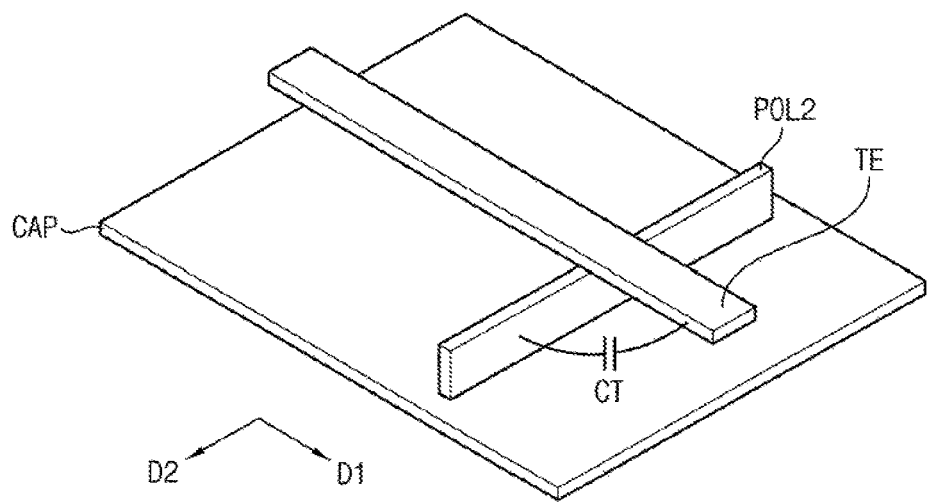
FIG. 4 is a conceptual diagram illustrating a capacitance formed between a polarizing touch electrode of the second polarizing element of FIG. 3 and a touch electrode of the touch electrode layer of FIG. 3 according to an embodiment.
Figure 5:
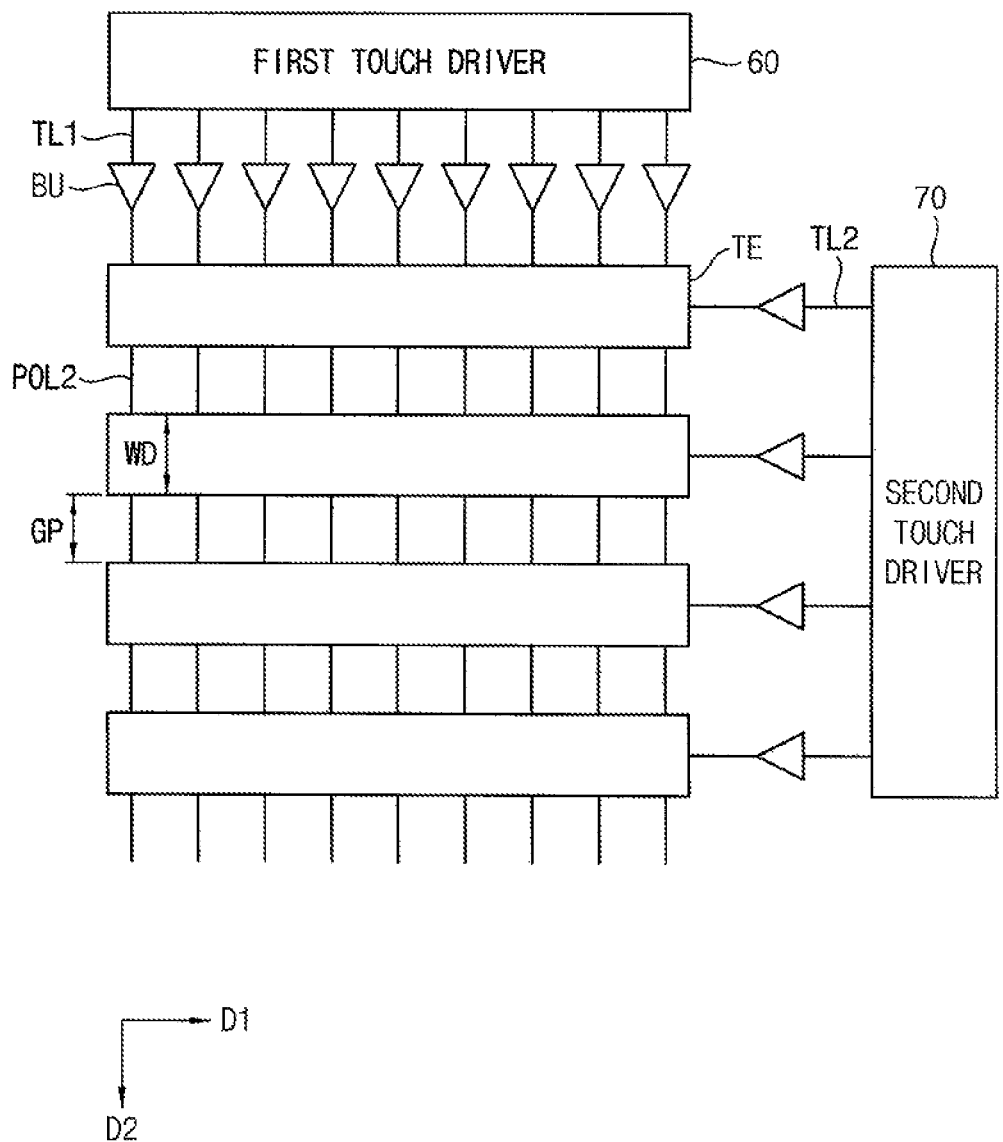
FIG. 5 is a conceptual diagram illustrating the polarizing touch electrodes of the second polarizing element of FIG. 2, the touch electrodes of the touch electrode layer of FIG. 2, and a first touch driver and a second touch driver of FIG. 1 according to an embodiment.

FIG. 3 is a perspective view illustrating the second polarizing element ICP and the touch electrode layer TEL of FIG. 2. FIG. 4 is a conceptual diagram illustrating a capacitance formed between a polarizing touch electrode POL2 of the second polarizing element ICP of FIG. 3 and a touch electrode TE of the touch electrode layer TEL of FIG. 3. FIG. 5 is a conceptual diagram illustrating the polarizing touch electrodes POL2 of the second polarizing element ICP of FIG. 2, the touch electrodes TE of the touch electrode layer TEL of FIG. 2, the first touch driver 60, and the second touch driver 70 of FIG. 1.

Referring to FIGS. 1 to 4, the second polarizing element ICP may include the plurality of the polarizing touch electrodes POL2 and a capping layer CAP to protect the polarizing touch electrodes POL2.

The touch electrode layer TEL may include a plurality of touch electrodes TE. The touch electrodes TE may cross the polarizing touch electrodes POL2.

For example, the polarizing touch electrodes POL2 may extend in the second direction D2. The touch electrodes TE may extend in the first direction D1.

The polarizing touch electrodes POL2 may be disposed on a layer different from a layer of the touch electrodes TE. In an embodiment, the polarizing touch electrodes POL2 may be disposed on the capping layer CAP. The polarizing touch electrodes POL2 may be disposed on the touch electrodes TE. For convenience of explanation, the insulating layer 240 disposed between the polarizing touch electrodes POL2 and the touch electrodes TE is not illustrated in FIGS. 3 and 4.

Capacitance may be formed between the polarizing touch electrodes POL2 and the touch electrodes TE. When a user touches the touch panel, the capacitance formed between the polarizing touch electrodes POL2 and the touch electrodes TE (at one or more electrode intersections) is changed, so that the touch position of the user may be sensed.

The first touch driver 60 is connected to the polarizing touch electrodes POL2 and may sense/receive an electric signal of/from the polarizing touch electrodes POL2. The first touch driver 60 may be connected to the polarizing touch electrodes POL2 through a first touch lines TL1. A buffer BU may be disposed on the first touch lines TL1 and may buffer the signal. The buffer BU on the first touch lines TL1 may output the signal to the polarizing touch electrodes POL2.

The second touch driver 70 is connected to the touch electrodes TE and may sense/receive an electric signal of/from the touch electrodes TE. The second touch driver 70 may be connected to the touch electrodes TE through a second touch lines TL2. A buffer BU may be disposed on the second touch lines TL2 to buffer the signal. The buffer BU on the second touch lines TL2 may output the signal to the touch electrodes TE.

The touch electrodes TE may have a first width WD in the second direction D2. The touch electrodes TE may be spaced apart from each other by a first gap GP in the second direction D2.

According to an embodiment, in the touch panel structure including the color converting layer including the quantum dot particles and the liquid crystal layer LC, the touch is sensed using the polarizing touch electrode POL2 of the second polarizing element ICP and the touch electrode TE of the touch electrode layer TEL. Herein, the polarizing touch electrode POL2 is disposed on the layer different from the touch electrode TE. Thus, the accuracy of sensing the touch may be improved. In addition, the second polarizing element ICP is used for the touch electrodes so that the touch function may be implemented by only adding the touch electrode layer TEL without adding an additional substrate. Thus, the manufacturing cost of the touch display apparatus may be reduced.

Figure 6:
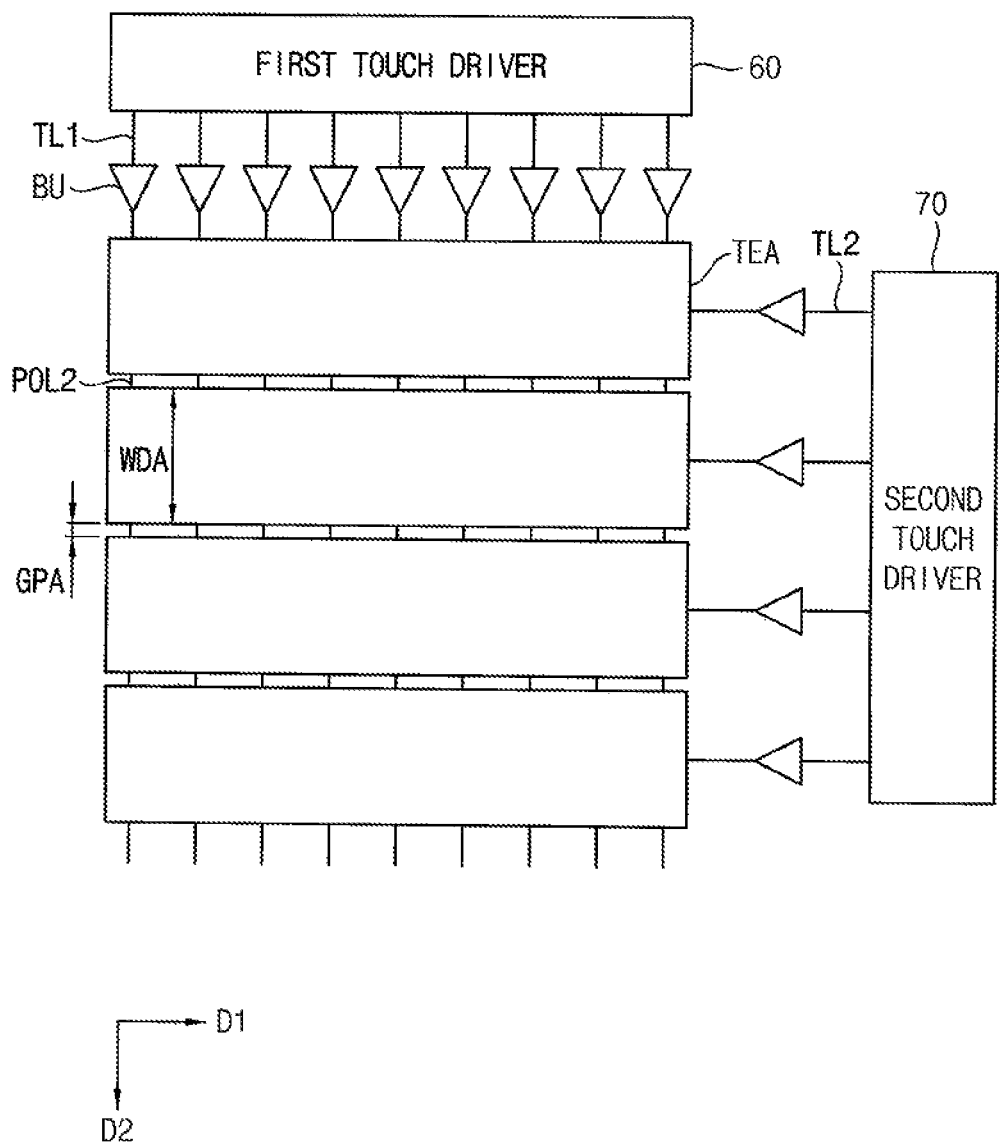
FIG. 6 is a conceptual diagram illustrating polarizing touch electrodes of a second polarizing element, touch electrodes of a touch electrode layer, a first touch driver, and a second touch driver according to an embodiment.

FIG. 6 is a conceptual diagram illustrating polarizing touch electrodes of a second polarizing element, touch electrodes of a touch electrode layer, a first touch driver and a second touch driver according to an embodiment.

The touch display apparatus illustrated in FIG. 6 is substantially the same as the touch display apparatus explained referring to FIGS. 1 to 5 except for the aspect ratio and/or shape of the touch electrode of the touch electrode layer. Thus, the same reference numerals will be used to refer to the same or like parts as those described in the previous embodiment of FIGS. 1 to 5 and related description may not be repeated.

Referring to FIGS. 1 to 4 and 6, the touch display apparatus may include a touch panel 10, a display panel driver and a touch driver. The display panel driver may include a timing controller 20, a gate driver 30, a gamma reference voltage generator 40 and a data driver 50. The touch driver may include a first touch driver 60 and a second touch driver 70. The touch display apparatus may further include a back light unit (e.g., BLU of FIG. 2).

The first touch driver 60 is connected to a plurality of first touch electrodes TE1 of the touch panel 10. The second touch driver 70 is connected to a plurality of second touch electrodes TE2 of the touch panel 10. The first and second touch drivers 60 and 70 sense a touch position using the first and second touch electrodes TE1 and TE2.

The first and second touch drivers 60 and 70 may sense the touch position using change of capacitance between the first and second touch electrodes TE1 and TE2.

The touch display apparatus includes the touch panel and a backlight unit BLU providing light to the touch panel. The backlight unit BLU may be disposed under the touch panel.

The touch panel may include a first polarizing element POL1, a first substrate 100, a liquid crystal layer LC, a second polarizing element ICP, a touch electrode layer TEL, a color converting layer and a second substrate 200. The touch panel may further include a switching element layer TFTL, an insulating layer 240 and an anti-reflection layer AR.

The first polarizing element POL1 has a first polarizing axis. The first substrate 100 is disposed on the first polarizing element POL1. The first substrate 100 may include a transparent insulation material. The switching element layer TFTL may be disposed on the first substrate 100. The liquid crystal layer LC is disposed on the first substrate 100.

The second polarizing element ICP is disposed on the liquid crystal layer LC. The second polarizing element ICP includes a plurality of polarizing touch electrodes POL2 extending in a direction of a second polarizing axis crossing the first polarizing axis.

The touch electrode layer TEL is disposed on the liquid crystal layer LC. The touch electrode layer TEL may be disposed adjacent to the second polarizing element ICP. The touch electrode layer TEL may include a plurality of touch electrodes TEA.

In an embodiment, the touch electrode layer TEL may be disposed on the second polarizing element ICP. The insulating layer 240 may be disposed between the touch electrode layer TEL and the second polarizing element ICP to insulate the touch electrodes TEA of the touch electrode layer TEL and the polarizing touch electrodes POL2 of the second polarizing element ICP.

The color converting layer may be disposed on the second polarizing element ICP. The color converting layer may be disposed on the touch electrode layer TEL. The color converting layer may include a first color converting pattern R, a second color converting pattern G and a third color converting pattern B. The color converting layer may further include a blue light blocking pattern 210, a covering layer 220 and a planarizing layer 230.

The second substrate 200 may be disposed on the color converting layer. The anti-reflection layer AR may be disposed on the second substrate 200.

The second polarizing element ICP may include the plurality of the polarizing touch electrodes POL2 and a capping layer CAP to protect the polarizing touch electrodes POL2.

The touch electrode layer TEL may include the plurality of the touch electrodes TEA. The touch electrodes TEA may cross the polarizing touch electrodes POL2.

For example, the polarizing touch electrodes POL2 may extend in the second direction D2. The touch electrodes TEA may extend in the first direction D1.

The polarizing touch electrodes POL2 may be disposed on a layer different from a layer of the touch electrodes TEA. In an embodiment, the polarizing touch electrodes POL2 may be disposed on the capping layer CAP. The polarizing touch electrodes POL2 may be disposed on the touch electrodes TEA.

Capacitance may be formed between the polarizing touch electrodes POL2 and the touch electrodes TEA. When a user touches the touch panel, the capacitance formed between the polarizing touch electrodes POL2 and the touch electrodes TEA is changed, so that the touch position of the user may be sensed.

The first touch driver 60 is connected to the polarizing touch electrodes POL2 and senses an electric signal of the polarizing touch electrodes POL2. The first touch driver 60 may be connected to the polarizing touch electrodes POL2 through a first touch lines TL1. A buffer BU may be disposed on the first touch lines TL1.

The second touch driver 70 is connected to the touch electrodes TEA and senses an electric signal of the touch electrodes TEA. The second touch driver 70 may be connected to the touch electrodes TEA through a second touch lines TL2. A buffer BU may be disposed on the second touch lines TL2.

The touch electrodes TEA may have a second width WDA in the second direction D2. The touch electrodes TEA may be spaced apart from each other by a second gap GPA in the second direction D2.

In an embodiment, the second width WDA of the touch electrodes TEA in the second direction D2 may be greater than the second gap GPA of immediately adjacent touch electrodes TEA in the second direction D2. Accordingly, the second gap GPA of the immediately adjacent touch electrodes TEA in the second direction D2 may be very little. The second gap GPA of the adjacent touch electrodes TEA in the second direction D2 is very little so that the touch electrodes TEA may cover most area of a display region of the touch panel. The touch electrodes TEA covers most area of a display region of the touch panel so that a display quality may not be significantly affected by the difference of the transmittance of the area overlapping the touch electrodes TEA and the area not overlapping the touch electrodes TEA.

According to an embodiment, in the touch panel structure including the color converting layer including the quantum dot particles and the liquid crystal layer LC, the touch is sensed using the polarizing touch electrode POL2 of the second polarizing element ICP and the touch electrode TEA of the touch electrode layer TEL. Herein, the polarizing touch electrode POL2 is disposed on the layer different from the touch electrode TEA. Thus, the accuracy of sensing the touch may be improved. In addition, the second polarizing element ICP is used to the touch electrodes so that the touch function may be implemented by only adding the touch electrode layer TEL without adding an additional substrate. Thus, the manufacturing cost of the touch display apparatus may be reduced.

Figure 7:
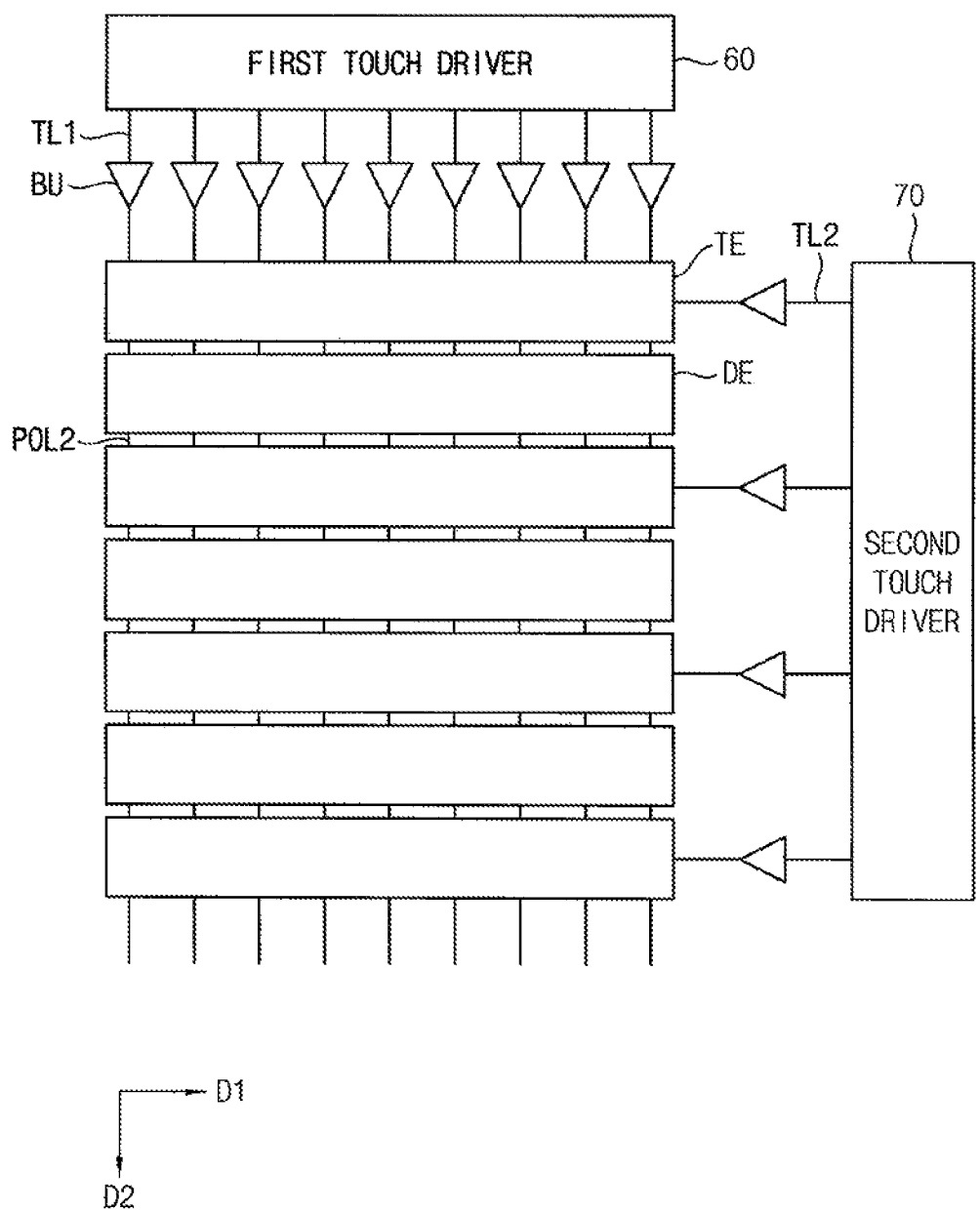
FIG. 7 is a conceptual diagram illustrating polarizing touch electrodes of a second polarizing element, touch electrodes of a touch electrode layer, a first touch driver, and a second touch driver according to an embodiment.

FIG. 7 is a conceptual diagram illustrating polarizing touch electrodes of a second polarizing element, touch electrodes of a touch electrode layer, a first touch driver and a second touch driver according to an embodiment.

The touch display apparatus illustrated in FIG. 7 is substantially the same as the touch display apparatus explained referring to FIGS. 1 to 5 except that the touch electrode layer further includes a dummy electrode. Thus, the same reference numerals will be used to refer to the same or like parts as those described in the previous embodiment of FIGS. 1 to 5 and related description may not be repeated.

Referring to FIGS. 1 to 4 and 7, the touch display apparatus may include a touch panel 10, a display panel driver and a touch driver. The display panel driver may include a timing controller 20, a gate driver 30, a gamma reference voltage generator 40 and a data driver 50. The touch driver may include a first touch driver 60 and a second touch driver 70. The touch display apparatus may further include a back light unit (e.g., BLU of FIG. 2).

The first touch driver 60 is connected to a plurality of first touch electrodes TE1 of the touch panel 10. The second touch driver 70 is connected to a plurality of second touch electrodes TE2 of the touch panel 10. The first and second touch drivers 60 and 70 sense a touch position using the first and second touch electrodes TE1 and TE2.

The first and second touch drivers 60 and 70 may sense the touch position using change of capacitance between the first and second touch electrodes TE1 and TE2.

The touch display apparatus includes the touch panel and a backlight unit BLU providing light to the touch panel. The backlight unit BLU may be disposed under the touch panel.

The touch panel may include a first polarizing element POL1, a first substrate 100, a liquid crystal layer LC, a second polarizing element ICP, a touch electrode layer TEL, a color converting layer and a second substrate 200. The touch panel may further include a switching element layer TFTL, an insulating layer 240 and an anti-reflection layer AR.

The first polarizing element POL1 has a first polarizing axis. The first substrate 100 is disposed on the first polarizing element POL1. The first substrate 100 may include a transparent insulation material. The switching element layer TFTL may be disposed on the first substrate 100. The liquid crystal layer LC is disposed on the first substrate 100.

The second polarizing element ICP is disposed on the liquid crystal layer LC. The second polarizing element ICP includes a plurality of polarizing touch electrodes POL2 extending in a direction of a second polarizing axis crossing the first polarizing axis.

The touch electrode layer TEL is disposed on the liquid crystal layer LC. The touch electrode layer TEL may be disposed adjacent to the second polarizing element ICP. The touch electrode layer TEL may include a plurality of touch electrodes TE.

In an embodiment, the touch electrode layer TEL may be disposed on the second polarizing element ICP. The insulating layer 240 may be disposed between the touch electrode layer TEL and the second polarizing element ICP to insulate the touch electrodes TE of the touch electrode layer TEL and the polarizing touch electrodes POL2 of the second polarizing element ICP.

The color converting layer may be disposed on the second polarizing element ICP. The color converting layer may be disposed on the touch electrode layer TEL. The color converting layer may include a first color converting pattern R, a second color converting pattern G and a third color converting pattern B. The color converting layer may further include a blue light blocking pattern 210, a covering layer 220 and a planarizing layer 230.

The second substrate 200 may be disposed on the color converting layer. The anti-reflection layer AR may be disposed on the second substrate 200.

The second polarizing element ICP may include the plurality of the polarizing touch electrodes POL2 and a capping layer CAP to protect the polarizing touch electrodes POL2.

The touch electrode layer TEL may include the plurality of the touch electrodes TE. The touch electrodes TE may cross the polarizing touch electrodes POL2.

For example, the polarizing touch electrodes POL2 may extend in the second direction D2. The touch electrodes TE may extend in the first direction D1.

The polarizing touch electrodes POL2 may be disposed on a layer different from a layer of the touch electrodes TE. In an embodiment, the polarizing touch electrodes POL2 may be disposed on the capping layer CAP. The polarizing touch electrodes POL2 may be disposed on the touch electrodes TE.

Capacitance may be formed between the polarizing touch electrodes POL2 and the touch electrodes TE. When a user touches the touch panel, the capacitance formed between the polarizing touch electrodes POL2 and the touch electrodes TE is changed, so that the touch position of the user may be sensed.

The first touch driver 60 is connected to the polarizing touch electrodes POL2 and senses an electric signal of the polarizing touch electrodes POL2. The first touch driver 60 may be connected to the polarizing touch electrodes POL2 through a first touch lines TL1. A buffer BU may be disposed on the first touch lines TL1.

The second touch driver 70 is connected to the touch electrodes TE and senses an electric signal of the touch electrodes TE. The second touch driver 70 may be connected to the touch electrodes TE through a second touch lines TL2. A buffer BU may be disposed on the second touch lines TL2.

In an embodiment, the touch electrode layer TEL may further include a dummy electrode DE. The dummy electrode DE is disposed between the touch electrodes TE. The dummy electrode DE may be spaced from and electrically isolated from the touch electrode TE. The dummy electrode DE may extend in a direction substantially the same as the extending direction of the touch electrodes TE. The dummy electrode DE may have an island shape. The dummy electrode DE may not be connected to the second touch driver 70 and may be electrically isolated from all drivers of the touch panel and/or the related touch display apparatus.

The dummy electrode DE may be disposed on a layer substantially the same as the layer of the touch electrode TE. The dummy electrode DE may include a material substantially the same as the material of the touch electrode TE.

The dummy electrodes DE are disposed between the touch electrodes TE so that the dummy electrodes DE and the touch electrodes TE may cover most area of a display region of the touch panel. The dummy electrodes DE and the touch electrodes TE cover most area of a display region of the touch panel so that a display quality may not be significantly affected by the difference of the transmittance of the area overlapping the touch electrodes TE or the dummy electrodes DE and the area not overlapping the touch electrodes TE or the dummy electrodes DE.

According to an embodiment, in the touch panel structure including the color converting layer including the quantum dot particles and the liquid crystal layer LC, the touch is sensed using the polarizing touch electrode POL2 of the second polarizing element ICP and the touch electrode TE of the touch electrode layer TEL. Herein, the polarizing touch electrode POL2 is disposed on the layer different from the touch electrode TE. Thus, the accuracy of sensing the touch may be improved. In addition, the second polarizing element ICP is used to the touch electrodes so that the touch function may be implemented by only adding the touch electrode layer TEL without adding an additional substrate. Thus, the manufacturing cost of the touch display apparatus may be reduced.

Figure 8:
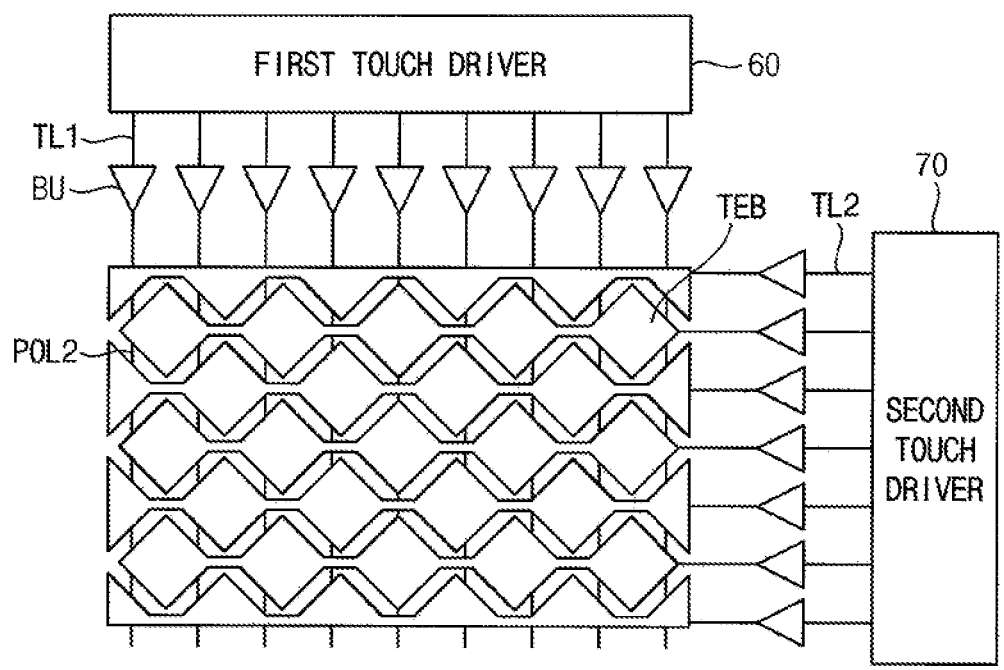
FIG. 8 is a conceptual diagram illustrating polarizing touch electrodes of a second polarizing element, touch electrodes of a touch electrode layer, a first touch driver, and a second touch driver according to an embodiment.
Figure 8:
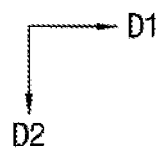

FIG. 8 is a conceptual diagram illustrating polarizing touch electrodes of a second polarizing element, touch electrodes of a touch electrode layer, a first touch driver and a second touch driver according to an embodiment.

The touch display apparatus illustrated in FIG. 8 is substantially the same as the touch display apparatus explained referring to FIGS. 1 to 5 except for the configurations and/or shape of the touch electrode of the touch electrode layer. Thus, the same reference numerals will be used to refer to the same or like parts as those described in the previous embodiment of FIGS. 1 to 5 and related description may not be repeated.

Referring to FIGS. 1 to 4 and 8, the touch display apparatus may include a touch panel 10, a display panel driver and a touch driver. The display panel driver may include a timing controller 20, a gate driver 30, a gamma reference voltage generator 40 and a data driver 50. The touch driver may include a first touch driver 60 and a second touch driver 70. The touch display apparatus may further include a back light unit (e.g., BLU of FIG. 2).

The first touch driver 60 is connected to a plurality of first touch electrodes TE1 of the touch panel 10. The second touch driver 70 is connected to a plurality of second touch electrodes TE2 of the touch panel 10. The first and second touch drivers 60 and 70 sense a touch position using the first and second touch electrodes TE1 and TE2.

The first and second touch drivers 60 and 70 may sense the touch position using change of capacitance between the first and second touch electrodes TE1 and TE2.

The touch display apparatus includes the touch panel and a backlight unit BLU providing light to the touch panel. The backlight unit BLU may be disposed under the touch panel.

The touch panel may include a first polarizing element POL1, a first substrate 100, a liquid crystal layer LC, a second polarizing element ICP, a touch electrode layer TEL, a color converting layer and a second substrate 200. The touch panel may further include a switching element layer TFTL, an insulating layer 240 and an anti-reflection layer AR.

The first polarizing element POL1 has a first polarizing axis. The first substrate 100 is disposed on the first polarizing element POL1. The first substrate 100 may include a transparent insulation material. The switching element layer TFTL may be disposed on the first substrate 100. The liquid crystal layer LC is disposed on the first substrate 100.

The second polarizing element ICP is disposed on the liquid crystal layer LC. The second polarizing element ICP includes a plurality of polarizing touch electrodes POL2 extending in a direction of a second polarizing axis crossing the first polarizing axis.

The touch electrode layer TEL is disposed on the liquid crystal layer LC. The touch electrode layer TEL may be disposed adjacent to the second polarizing element ICP. The touch electrode layer TEL may include a plurality of touch electrodes TEB.

In an embodiment, the touch electrode layer TEL may be disposed on the second polarizing element ICP. The insulating layer 240 may be disposed between the touch electrode layer TEL and the second polarizing element ICP to insulate the touch electrodes TEB of the touch electrode layer TEL and the polarizing touch electrodes POL2 of the second polarizing element ICP.

The color converting layer may be disposed on the second polarizing element ICP. The color converting layer may be disposed on the touch electrode layer TEL. The color converting layer may include a first color converting pattern R, a second color converting pattern G and a third color converting pattern B. The color converting layer may further include a blue light blocking pattern 210, a covering layer 220 and a planarizing layer 230.

The second substrate 200 may be disposed on the color converting layer. The anti-reflection layer AR may be disposed on the second substrate 200.

The second polarizing element ICP may include the plurality of the polarizing touch electrodes POL2 and a capping layer CAP to protect the polarizing touch electrodes POL2.

The touch electrode layer TEL may include the plurality of the touch electrodes TEB. The touch electrodes TEB may cross the polarizing touch electrodes POL2.

For example, the polarizing touch electrodes POL2 may extend in the second direction D2. The touch electrodes TEB may extend in the first direction D1.

The polarizing touch electrodes POL2 may be disposed on a layer different from a layer of the touch electrodes TEB. In an embodiment, the polarizing touch electrodes POL2 may be disposed on the capping layer CAP. The polarizing touch electrodes POL2 may be disposed on the touch electrodes TEB.

Capacitance may be formed between the polarizing touch electrodes POL2 and the touch electrodes TEB. When a user touches the touch panel, the capacitance formed between the polarizing touch electrodes POL2 and the touch electrodes TEB is changed, so that the touch position of the user may be sensed.

The first touch driver 60 is connected to the polarizing touch electrodes POL2 and senses an electric signal of the polarizing touch electrodes POL2. The first touch driver 60 may be connected to the polarizing touch electrodes POL2 through a first touch lines TL1. A buffer BU may be disposed on the first touch lines TL1.

The second touch driver 70 is connected to the touch electrodes TEB and senses an electric signal of the touch electrodes TEB. The second touch driver 70 may be connected to the touch electrodes TEB through a second touch lines TL2. A buffer BU may be disposed on the second touch lines TL2.

In an embodiment, the touch electrode TEB may include a plurality of sensing portions and a connecting portion electrically connecting the sensing portions. The sensing portion may have a rhombus shape. The touch electrodes TEB may cover most area of a display region of the touch panel. The touch electrodes TEB covers most area of a display region of the touch panel so that a display quality may not be significantly affected by the difference of the transmittance of the area overlapping the touch electrodes TEB and the area not overlapping the touch electrodes TEB.

According to an embodiment, in the touch panel structure including the color converting layer including the quantum dot particles and the liquid crystal layer LC, the touch is sensed using the polarizing touch electrode POL2 of the second polarizing element ICP and the touch electrode TEB of the touch electrode layer TEL. Herein, the polarizing touch electrode POL2 is disposed on the layer different from the touch electrode TEB. Thus, the accuracy of sensing the touch may be improved. In addition, the second polarizing element ICP is used to the touch electrodes so that the touch function may be implemented by only adding the touch electrode layer TEL without adding an additional substrate. Thus, the manufacturing cost of the touch display apparatus may be reduced.

Figure 9:
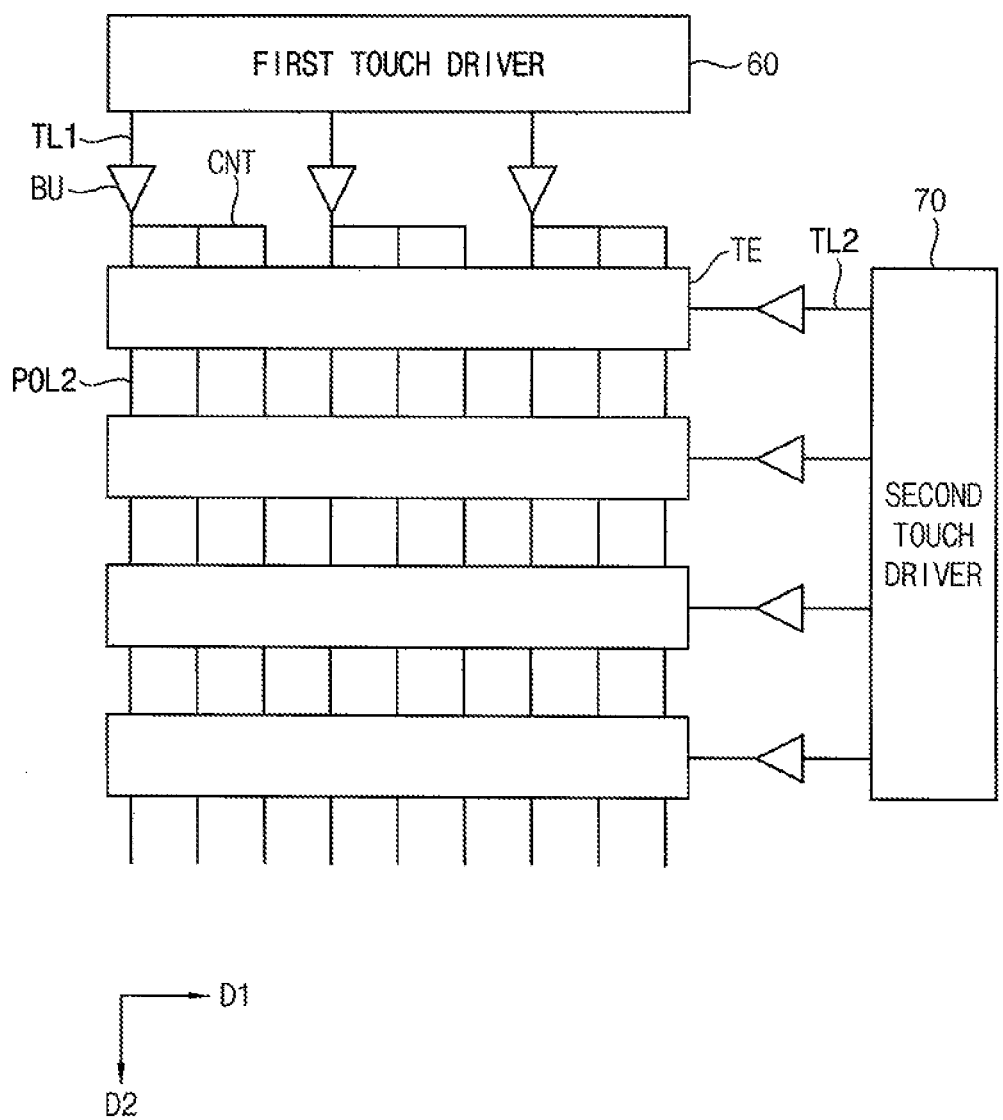
FIG. 9 is a conceptual diagram illustrating polarizing touch electrodes of a second polarizing element, touch electrodes of a touch electrode layer, a first touch driver, and a second touch driver according to an embodiment.

FIG. 9 is a conceptual diagram illustrating polarizing touch electrodes of a second polarizing element, touch electrodes of a touch electrode layer, a first touch driver and a second touch driver according to an embodiment.

The touch display apparatus illustrated in FIG. 9 is substantially the same as the touch display apparatus explained referring to FIGS. 1 to 5 except that some of the polarizing touch electrodes are electrically connected to each other. Thus, the same reference numerals will be used to refer to the same or like parts as those described in the previous embodiment of FIGS. 1 to 5 and related description may not be repeated.

Referring to FIGS. 1 to 4 and 9, the touch display apparatus may include a touch panel 10, a display panel driver and a touch driver. The display panel driver may include a timing controller 20, a gate driver 30, a gamma reference voltage generator 40 and a data driver 50. The touch driver may include a first touch driver 60 and a second touch driver 70. The touch display apparatus may further include a back light unit (e.g., BLU of FIG. 2).

The first touch driver 60 is connected to a plurality of first touch electrodes TE1 of the touch panel 10. The second touch driver 70 is connected to a plurality of second touch electrodes TE2 of the touch panel 10. The first and second touch drivers 60 and 70 sense a touch position using the first and second touch electrodes TE1 and TE2.

The first and second touch drivers 60 and 70 may sense the touch position using change of capacitance between the first and second touch electrodes TE1 and TE2.

The touch display apparatus includes the touch panel and a backlight unit BLU providing light to the touch panel. The backlight unit BLU may be disposed under the touch panel.

The touch panel may include a first polarizing element POL1, a first substrate 100, a liquid crystal layer LC, a second polarizing element ICP, a touch electrode layer TEL, a color converting layer and a second substrate 200. The touch panel may further include a switching element layer TFTL, an insulating layer 240 and an anti-reflection layer AR.

The first polarizing element POL1 has a first polarizing axis. The first substrate 100 is disposed on the first polarizing element POL1. The first substrate 100 may include a transparent insulation material. The switching element layer TFTL may be disposed on the first substrate 100. The liquid crystal layer LC is disposed on the first substrate 100.

The second polarizing element ICP is disposed on the liquid crystal layer LC. The second polarizing element ICP includes a plurality of polarizing touch electrodes POL2 extending in a direction of a second polarizing axis crossing the first polarizing axis.

The touch electrode layer TEL is disposed on the liquid crystal layer LC. The touch electrode layer TEL may be disposed adjacent to the second polarizing element ICP. The touch electrode layer TEL may include a plurality of touch electrodes TE.

In an embodiment, the touch electrode layer TEL may be disposed on the second polarizing element ICP. The insulating layer 240 may be disposed between the touch electrode layer TEL and the second polarizing element ICP to insulate the touch electrodes TE of the touch electrode layer TEL and the polarizing touch electrodes POL2 of the second polarizing element ICP.

The color converting layer may be disposed on the second polarizing element ICP. The color converting layer may be disposed on the touch electrode layer TEL. The color converting layer may include a first color converting pattern R, a second color converting pattern G and a third color converting pattern B. The color converting layer may further include a blue light blocking pattern 210, a covering layer 220 and a planarizing layer 230.

The second substrate 200 may be disposed on the color converting layer. The anti-reflection layer AR may be disposed on the second substrate 200.

The second polarizing element ICP may include the plurality of the polarizing touch electrodes POL2 and a capping layer CAP to protect the polarizing touch electrodes POL2.

The touch electrode layer TEL may include the plurality of the touch electrodes TE. The touch electrodes TE may cross the polarizing touch electrodes POL2.

For example, the polarizing touch electrodes POL2 may extend in the second direction D2. The touch electrodes TE may extend in the first direction D1.

The polarizing touch electrodes POL2 may be disposed on a layer different from a layer of the touch electrodes TE. In an embodiment, the polarizing touch electrodes POL2 may be disposed on the capping layer CAP. The polarizing touch electrodes POL2 may be disposed on the touch electrodes TE.

Capacitance may be formed between the polarizing touch electrodes POL2 and the touch electrodes TE. When a user touches the touch panel, the capacitance formed between the polarizing touch electrodes POL2 and the touch electrodes TE is changed, so that the touch position of the user may be sensed.

The first touch driver 60 is connected to the polarizing touch electrodes POL2 and senses an electric signal of the polarizing touch electrodes POL2. The first touch driver 60 may be connected to the polarizing touch electrodes POL2 through a first touch lines TL1. A buffer BU may be disposed on the first touch lines TL1.

In an embodiment, the touch display apparatus may further include a connecting line CNT electrically connecting two or more of the polarizing touch electrodes POL2 to one another. Generally, a pitch of the polarizing touch electrodes POL2 is less than the touch electrodes TE so that a touch resolution of the polarizing touch electrodes POL2 is greater than a touch resolution of the touch electrodes TE. Thus, the polarizing touch electrodes POL2 may be connected to each other by the connecting line CNT. The connecting line CNT connects the polarizing touch electrodes POL2 such that the touch resolution of the polarizing touch electrodes POL2 is substantially the same as the touch resolution of the touch electrodes TE. Although three polarizing touch electrodes POL2 are connected to each other by the connecting line CNT illustrated in FIG. 9, fewer or more polarizing touch electrodes POL2 may be electrically connected to one another. In an embodiment, a number in a range of 100 to 200 of polarizing touch electrodes POL2 may be connected to each other by the connecting line CNT.

The second touch driver 70 is connected to the touch electrodes TE and senses an electric signal of the touch electrodes TE. The second touch driver 70 may be connected to the touch electrodes TE through a second touch lines TL2. A buffer BU may be disposed on the second touch lines TL2.

According to an embodiment, in the touch panel structure including the color converting layer including the quantum dot particles and the liquid crystal layer LC, the touch is sensed using the polarizing touch electrode POL2 of the second polarizing element ICP and the touch electrode TE of the touch electrode layer TEL. Herein, the polarizing touch electrode POL2 is disposed on the layer different from the touch electrode TE. Thus, the accuracy of sensing the touch may be improved. In addition, the second polarizing element ICP is used to the touch electrodes so that the touch function may be implemented by only adding the touch electrode layer TEL without adding an additional substrate. Thus, the manufacturing cost of the touch display apparatus may be reduced.

Figure 10:
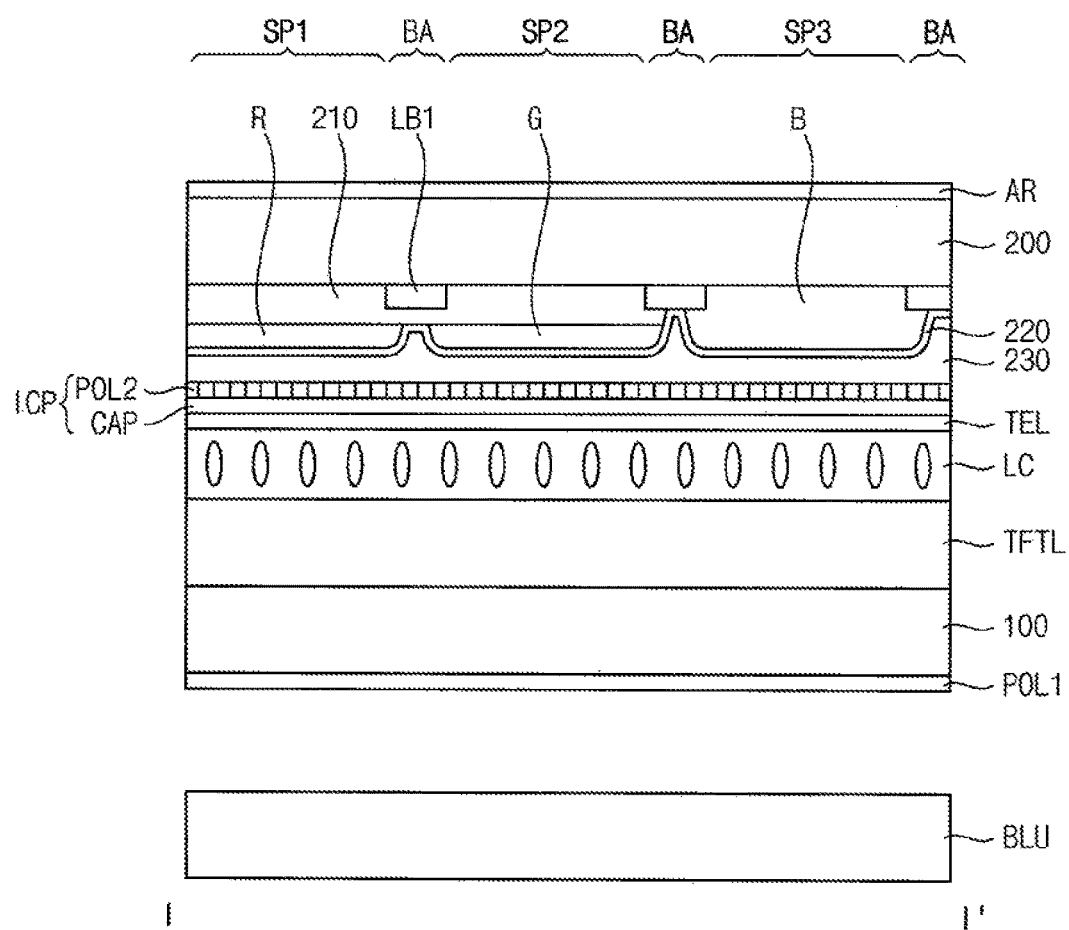
FIG. 10 is a cross-sectional view of a touch display apparatus according to an embodiment.
Figure 11:
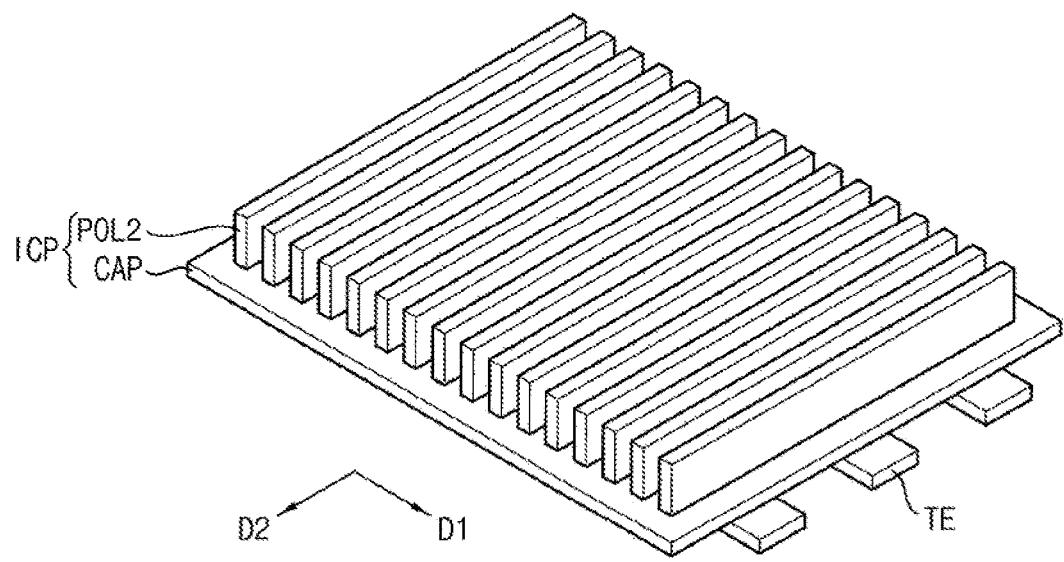
FIG. 11 is a perspective view illustrating a second polarizing element and a touch electrode layer of FIG. 10 according to an embodiment.

FIG. 10 is a cross-sectional view of a touch display apparatus according to an embodiment. FIG. 11 is a perspective view illustrating a second polarizing element and a touch electrode layer of FIG. 10.

The touch display apparatus illustrated in FIG. 10 and FIG. 11 is substantially the same as the touch display apparatus explained referring to FIGS. 1 to 5 except for the configurations and/or positions of the second polarizing element and the touch electrode layer. Thus, the same reference numerals will be used to refer to the same or like parts as those described in the previous embodiment of FIGS. 1 to 5 and related description may not be repeated.

Referring to FIGS. 1, 5, 10 and 11, the touch display apparatus may include a touch panel 10, a display panel driver and a touch driver. The display panel driver may include a timing controller 20, a gate driver 30, a gamma reference voltage generator 40 and a data driver 50. The touch driver may include a first touch driver 60 and a second touch driver 70. The touch display apparatus may further include a back light unit BLU.

The first touch driver 60 is connected to a plurality of first touch electrodes TE1 of the touch panel 10. The second touch driver 70 is connected to a plurality of second touch electrodes TE2 of the touch panel 10. The first and second touch drivers 60 and 70 and/or processor may sense a touch position using the first and second touch electrodes TE1 and TE2.

The first and second touch drivers 60 and 70 and/or a processor may sense the touch position using change of capacitance between the first and second touch electrodes TE1 and TE2.

The touch display apparatus includes the touch panel and a backlight unit BLU providing light to the touch panel. The backlight unit BLU may be disposed under the touch panel.

The touch panel may include a first polarizing element POL1, a first substrate 100, a liquid crystal layer LC, a second polarizing element ICP, a touch electrode layer TEL, a color converting layer and a second substrate 200. The touch panel may further include a switching element layer TFTL, an insulating layer 240 and an anti-reflection layer AR.

The first polarizing element POL1 has a first polarizing axis. The first substrate 100 is disposed on the first polarizing element POL1. The first substrate 100 may include a transparent insulation material. The switching element layer TFTL may be disposed on the first substrate 100. The liquid crystal layer LC is disposed on the first substrate 100.

The second polarizing element ICP is disposed on the liquid crystal layer LC. The second polarizing element ICP includes a plurality of polarizing touch electrodes POL2 extending in a direction of a second polarizing axis crossing the first polarizing axis and a capping layer protecting the polarizing touch electrodes POL2.

The touch electrode layer TEL is disposed on the liquid crystal layer LC. The touch electrode layer TEL may be disposed adjacent to the second polarizing element ICP. The touch electrode layer TEL may include a plurality of touch electrodes TE.

In an embodiment, the touch electrode layer TEL may be disposed between the second polarizing element ICP and the liquid crystal layer LC. The capping layer CAP may be disposed between the polarizing touch electrodes POL2 and the touch electrodes TE to insulate the polarizing touch electrodes POL2 and the touch electrodes TE.

The color converting layer may be disposed on the second polarizing element ICP. The color converting layer may be disposed on the touch electrode layer TEL. The color converting layer may include a first color converting pattern R, a second color converting pattern G and a third color converting pattern B. The color converting layer may further include a blue light blocking pattern 210, a covering layer 220 and a planarizing layer 230.

The second substrate 200 may be disposed on the color converting layer. The anti-reflection layer AR may be disposed on the second substrate 200.

The touch electrode layer TEL may include the plurality of the touch electrodes TE. The touch electrodes TE may cross the polarizing touch electrodes POL2.

For example, the polarizing touch electrodes POL2 may extend in the second direction D2. The touch electrodes TE may extend in the first direction D1.

The polarizing touch electrodes POL2 may be disposed on a layer different from a layer of the touch electrodes TE. In an embodiment, the capping layer CAP may be disposed on the touch electrodes TE. The polarizing touch electrodes POL2 may be disposed on the capping layer CAP.

Capacitance may be formed between the polarizing touch electrodes POL2 and the touch electrodes TE. When a user touches the touch panel, the capacitance formed between the polarizing touch electrodes POL2 and the touch electrodes TE is changed, so that the touch position of the user may be sensed.

The first touch driver 60 is connected to the polarizing touch electrodes POL2 and senses an electric signal of the polarizing touch electrodes POL2. The first touch driver 60 may be connected to the polarizing touch electrodes POL2 through a first touch lines TL1. A buffer BU may be disposed on the first touch lines TL1.

The second touch driver 70 is connected to the touch electrodes TE and senses an electric signal of the touch electrodes TE. The second touch driver 70 may be connected to the touch electrodes TE through a second touch lines TL2. A buffer BU may be disposed on the second touch lines TL2.

According to an embodiment, in the touch panel structure including the color converting layer including the quantum dot particles and the liquid crystal layer LC, the touch is sensed using the polarizing touch electrode POL2 of the second polarizing element ICP and the touch electrode TE of the touch electrode layer TEL. Herein, the polarizing touch electrode POL2 is disposed on the layer different from the touch electrode TE. Thus, the accuracy of sensing the touch may be improved. In addition, the second polarizing element ICP is used to the touch electrodes so that the touch function may be implemented by only adding the touch electrode layer TEL without adding an additional substrate. Thus, the manufacturing cost of the touch display apparatus may be reduced.

According embodiments, accuracy of touch sensing may be satisfactory, and/or the manufacturing cost of a touch panel and/or touch display apparatus may be minimized.

The foregoing is illustrative and is not to be construed as limiting. Although a few embodiments have been described, those skilled in the art will readily appreciate that many modifications are possible in the embodiments. All such modifications are intended to be included within the scope defined in the claims.

What is claimed is:
1. A touch panel comprising:
    a first polarizing element having a first polarizing axis;
    a first substrate disposed on the first polarizing element;
    a liquid crystal layer disposed on the first substrate;
    a second polarizing element disposed on the liquid crystal layer, comprising a plurality of polarizing touch electrodes, and having a second polarizing axis crossing the first polarizing axis;
    a touch electrode layer disposed on the liquid crystal layer, disposed adjacent to the second polarizing element, and comprising a plurality of touch electrodes;
    a color converting layer disposed on the second polarizing element and comprising a quantum dot particle, wherein the second polarizing element and the touch electrode layer are disposed between the color converting layer and the liquid crystal layer; and
    a second substrate disposed on the color converting layer.

2. The touch panel of claim 1, wherein a touch electrode of the touch electrode layer extends in a first direction, and
    wherein a polarizing touch electrode of the second polarizing element extends in a second direction crossing the first direction.

3. The touch panel of claim 2, wherein a capacitance formed between the touch electrode and the polarizing touch electrode is changed when a user touches the touch panel.

4. The touch panel of claim 2, wherein a width of the touch electrode in the second direction is greater than a gap between two immediately neighboring touch electrodes of the touch electrode layer in the second direction.

5. The touch panel of claim 2, wherein the touch electrode layer further comprises a dummy electrode disposed between two of the touch electrodes and electrically isolated from all drivers of the touch panel.

6. The touch panel of claim 2, wherein the touch electrode comprises two sensing portions and a connecting portion electrically connecting the two sensing portions, and wherein each of the two sensing portions is wider than the connecting portion in the second direction.

7. The touch panel of claim 2, further comprising a connecting line electrically connecting two or more of the polarizing touch electrodes.

8. The touch panel of claim 2, wherein the second polarizing element is disposed between the touch electrode layer and the liquid crystal layer,
    the second polarizing element further includes a capping layer disposed under the polarizing touch electrodes to protect the polarizing touch electrodes, and
    further comprising an insulating layer disposed between the polarizing touch electrodes and the touch electrodes.

9. The touch panel of claim 2, wherein the touch electrode layer is disposed between the second polarizing element and the liquid crystal layer,
    the second polarizing element further includes a capping layer disposed under the polarizing touch electrodes to protect the polarizing touch electrodes, and
    the capping layer is disposed between the polarizing touch electrodes and the touch electrodes.

10. The touch panel of claim 1, wherein the color converting layer includes a first subpixel area including a plurality of red quantum dot particles and a second subpixel area including a plurality of green quantum dot particles.

11. The touch panel of claim 10, wherein the color converting layer further includes a third subpixel area including a plurality of scattering particles.

12. A touch display apparatus comprising:
    a touch panel comprising:
        a first polarizing element having a first polarizing axis;

a first substrate disposed on the first polarizing element and comprising gate line, a data line, and a switching element electrically connected to each of the gate line and the data line;

a liquid crystal layer disposed on the first substrate;

a second polarizing element disposed on the liquid crystal layer, comprising a plurality of polarizing touch electrodes, and having a second polarizing axis crossing the first polarizing axis;

a touch electrode layer disposed on the liquid crystal layer, disposed adjacent to the second polarizing element, and comprising a plurality of touch electrodes;

a color converting layer disposed on the second polarizing element and comprising a quantum dot particle, wherein the second polarizing element and the touch electrode layer are disposed between the color converting layer and the first polarizing element; and a second substrate disposed on the color converting layer;

a backlight unit configured to provide light to the touch panel;

a gate driver configured to drive the gate line;

a data driver configured to drive the data line;

a first touch driver electrically connected to the polarizing touch electrodes of the second polarizing element; and a second touch driver electrically connected to the touch electrodes of the touch electrode layer.

13. The touch display apparatus of claim 12, wherein a touch electrode of the touch electrode layer extends in a first direction, and wherein a polarizing touch electrode of the second polarizing element extends in a second direction crossing the first direction.

14. The touch display apparatus of claim 13, further comprising a buffer and a signal line, wherein the first touch driver is electrically connected through the signal line and the buffer to the second polarizing element.

15. The touch display apparatus of claim 13, further comprising a connecting line electrically connecting two or more of the polarizing touch electrodes.

16. The touch display apparatus of claim 12, wherein the backlight unit is configured to provide blue light to the touch panel.

17. The touch display apparatus of claim 12, wherein the touch electrode layer further comprises a dummy electrode disposed between two of the touch electrodes and electrically isolated from the second touch driver.

18. The touch display apparatus of claim 12, further comprising an insulating layer disposed between the second polarizing element and the touch electrode layer and directly contacting each of the second polarizing element and the touch electrode layer.

19. The touch display apparatus of claim 12, wherein a touch electrode of the touch electrodes extends in a first direction, wherein a polarizing touch electrode of the polarizing touch electrodes extends in a second direction crossing the first direction, wherein a width of the touch electrode in the second direction is greater than a width of the polarizing touch electrode in the first direction, and wherein the touch electrode is thinner than the polarizing touch electrode in a third direction perpendicular to each of the first direction and the second direction.

20. The touch display apparatus of claim 12, further comprising an insulating layer disposed between the second polarizing element and the touch electrode layer and directly contacting each of the second polarizing element and the touch electrode layer, wherein the liquid crystal layer is disposed between the insulating layer and the first polarizing element.

* * * * *